(12) United States Patent
Gahan et al.

(10) Patent No.: US 8,253,945 B2
(45) Date of Patent: Aug. 28, 2012

(54) OPTICAL SENSOR

(75) Inventors: David Francis Gahan, West Hanney (GB); Arnold Peter Roscoe Harpin, Iffley Village (GB); Robert Stevens, Swindon (GB)

(73) Assignee: The Science and Technology Facilities Council, Oxfordshire (GB)

( * ) Notice: Subject to any disclaimer, the term of this patent is extended or adjusted under 35 U.S.C. 154(b) by 353 days.

(21) Appl. No.: 11/547,629

(22) PCT Filed: Apr. 8, 2005

(86) PCT No.: PCT/GB2005/001377
§ 371 (c)(1),
(2), (4) Date: Oct. 5, 2006

(87) PCT Pub. No.: WO2005/098385
PCT Pub. Date: Oct. 20, 2005

(65) Prior Publication Data
US 2007/0223000 A1    Sep. 27, 2007

(30) Foreign Application Priority Data
Apr. 8, 2004 (GB) .................................. 0408073.5

(51) Int. Cl.
*G01B 9/02* (2006.01)
(52) U.S. Cl. .................................................... 356/480
(58) Field of Classification Search .............. 356/35.5, 356/519, 454, 506, 480; 385/12, 13
See application file for complete search history.

(56) References Cited

U.S. PATENT DOCUMENTS

| | | | |
|---|---|---|---|
| 4,933,545 A * | 6/1990 | Saaski et al. | 250/227.14 |
| 5,058,983 A * | 10/1991 | Corke et al. | 385/78 |
| 5,129,897 A | 7/1992 | Daikuzono | |
| 5,182,779 A | 1/1993 | D'Agostino et al. | |
| 5,297,480 A * | 3/1994 | Miyashita et al. | 100/90 |
| 5,315,110 A * | 5/1994 | Smith | 250/227.27 |
| 5,381,229 A * | 1/1995 | Murphy et al. | 356/477 |
| 5,559,358 A | 9/1996 | Burns et al. | |
| 5,619,046 A | 4/1997 | Engstrom et al. | |
| 5,657,405 A * | 8/1997 | Fujiwara | 385/12 |
| 5,870,511 A * | 2/1999 | Sawatari et al. | 385/12 |

(Continued)

FOREIGN PATENT DOCUMENTS
EP    0 583 048 A    2/1994
(Continued)

OTHER PUBLICATIONS

Physics Letters A, No. 309, (Mar. 17, 2003), Marin et al., "A folded Fabry-Perot cavity for optical sensing in gravitational wave detectors", pp. 15-23.

(Continued)

*Primary Examiner* — Tarifur Chowdhury
*Assistant Examiner* — Jonathan Hansen
(74) *Attorney, Agent, or Firm* — Birch, Stewart, Kolasch & Birch, LLP

(57) ABSTRACT

An optical sensor having a sapphire body is disclosed. A hollow in the sapphire body defines a surface which is used as a surface of a Fabry-Perot cavity. Interferometry is used to detect changes in the length of the Fabry-Perot cavity, and hence changes in, for example, the temperature or pressure of an environment in which the sensor is placed.

46 Claims, 5 Drawing Sheets

U.S. PATENT DOCUMENTS

| | | | |
|---|---|---|---|
| 6,233,374 B1* | 5/2001 | Ogle et al. ............... | 385/13 |
| 2002/0003917 A1 | 1/2002 | Sherrer et al. | |
| 2002/0009252 A1 | 1/2002 | Maron et al. | |
| 2002/0020221 A1 | 2/2002 | Sittler et al. | |
| 2005/0062979 A1* | 3/2005 | Zhu et al. ............... | 356/480 |
| 2005/0195402 A1* | 9/2005 | May et al. ............... | 356/480 |
| 2007/0006663 A1* | 1/2007 | Zerwekh et al. ........ | 73/800 |

FOREIGN PATENT DOCUMENTS

| | | |
|---|---|---|
| GB | 2 204 948 A | 11/1988 |
| GB | 2 257 505 A | 1/1993 |
| GB | 2 338 059 A | 12/1999 |
| JP | 2-213804 A | 8/1990 |
| WO | WO 98/56575 | 12/1998 |
| WO | WO-99/60341 A | 11/1999 |

OTHER PUBLICATIONS http://www.gravity.pd.uwa.edu.au/laser/laser.html, Mar. 23, 2000, see "Laser Frequency Stabilisation", The University of Western Ausstralia, Department of Physics, Australian International Gravitational Research Centre, "Laser Interferometer and Suspension Project".

* cited by examiner

OPTICAL SENSOR

The present invention relates to an optical sensor for measuring one or more parameters through the modification of incident radiation and to the fabrication of such a sensor. In particular, though not exclusively, the present invention relates to a micro optical sensor adapted to receive an optical fibre and to modify radiation communicated via the optical fibre, the modification being dependent upon the environmental conditions to which the sensor is exposed, including but not limited to pressure, temperature, electromagnetic fields, acoustics and luminance.

DISCUSSION OF THE PRIOR ART

WO 99/60341 describes an optical sensor, fabricated using conventional micromachining techniques, For measuring changes in temperature and pressure inside a combustion engine. The sensor comprises a slab of silicon having a recess defined in one surface by etching. A micro-capillary, having a silica fibre fixed inside, is adhered to the silicon slab so as to close the recess. The face of the silica fibre and the inner surface of the recess directly opposite the fibre serve to define a Fabry-Perot cavity. Light incident along the silica fibre is reflected within the Fabry-Perot cavity and guided back along the silica fibre. The reflected light creates interference fringes whose characteristics are determined by the length of the Fabry-Perot cavity. Changes in the external pressure cause the wall of the silicon slab directly opposite the fibre to deflect, causing a change in the length of the Fabry-Perot cavity. This in turn creates a change in the characteristics of the interference fringes thus registering a change in pressure. The sensor may also be used to sense changes in temperature by employing a suitably thick slab of silicon. Changes in temperature cause the slab to expand or contract, which in turn results in a similar expansion or contraction of the Fabry-Perot cavity.

Whilst the silicon sensor may be used for many applications, the sensor is unsuitable for environments that are chemically harsh or at elevated temperatures. In particular, the maximum temperature at which the silicon sensor can operate is around 450° C. Above this temperature, the elastic properties of silicon become unstable making any measurements unreliable. Additionally, strong acids and caustics (e.g. hydrofluoric acid, sulphuric acid, nitric acid, chromic acid and sodium hydroxide) attack silicon, even at room temperature.

U.S. Pat. No. 5,381,229 describes an optical sensor comprising a sapphire fibre coupled at one end to a silica fibre. Incident laser light is transmitted along the silica fibre where it is partially reflected at the silica:sapphire interface and at the sapphire:air interface. The reflected light is transmitted back along the silica fibre to an interferometer. The interference fringes created by the reflected light are characterised by the length of the sapphire fibre, which serves as a Fabry-Perot cavity. Changes in temperature cause the sapphire fibre, and thus the length of the Fabry-Perot cavity, to expand or contract which is registered by changes in the interference fringes. Owing to the high melting point of sapphire (~2050° C.), the sapphire fibre is able to probe environments at temperatures well above that possible with a silica fibre. However, the reflectivity of the silica:sapphire and sapphire:air interfaces is around 1% and 7% respectively. Accordingly, only a very small fraction of the incident light is reflected resulting in poor visibility of the interference fringes. Although the document describes adding a reflective film to the end face of the sapphire fibre to improve the reflectivity at this interface, the reflectivity of the film is likely to deteriorate (e.g. oxidise) or react with the sapphire fibre at high temperatures.

The sensor may also be used to sense changes in the position of an external reflective surface. As already noted, only 7% of the incident light transmitted along the sapphire fibre is reflected at the sapphire:air interface. The remainder of the light exits the sapphire fibre. By positioning the end of the sapphire fibre adjacent a reflective surface, light exiting the sapphire fibre may be reflected by the external surface back along the sapphire fibre. The light reflected at the sapphire:air interface and at the external reflective surface serve to define a further Fabry-Perot cavity. Changes in the position of the reflective surface relative to the sapphire fibre may therefore provide an indirect measurement of pressure, strain or temperature of the reflective surface. Nevertheless, the sensor is incapable of directly measuring the fluid pressure to which the sensor is exposed. Moreover, the sensor relies upon an external reflective surface to provide an indirect measurement of pressure.

US 2002/0020221 describes a differential pressure sensor comprising a pair of pressure diaphragms mounted on either side of an annular support. The diaphragms and annular support may be made of sapphire. A central coupling member extends between and is attached to the two pressure diaphragms. The coupling member carries an optical element, such as a diffraction grating. A light source and receiver are positioned on opposite sides of the pressure sensor such that light from the source passes through the annular support, strikes the optical element, passes through the annular support and is received by the receiver. When the pressure exerted on one of the pressure diaphragms differs from that exerted on the other diaphragm, the pair of diaphragms and the central coupling member deflect upwards or downwards. Movement of the coupling member brings about a similar movement in the optical member, which is detected as variations in the light received by the receiver. Unfortunately, the sensor is capable of measuring differential pressure only. In order to measure absolute pressure, it is necessary to isolate one of the pressure diaphragms from the environment being sensed.

In an alternative embodiment, one of the pressure diaphragms carries a reflective element or has a reflective surface. Light from the source is then guided from the side of the sensor to the surface of the diaphragm. However, there is no mention of how the light might be guided from the side of the sensor to the diaphragm surface, or how the reflected light might be collected and received.

SUMMARY OF THE INVENTION

It is therefore an object of the present invention to provide an optical sensor capable of operating under adverse conditions not presently possible with silicon sensors and which overcomes, at least in part, some of the aforementioned disadvantages of the prior art. An additional object of the present invention is to provide a method of manufacturing the optical sensor.

Accordingly, in a first aspect, the present invention provides an optical sensor comprising a sapphire body having a surface describing at least part of a hollow, said surface being reflective to incident light and defining a surface of a Fabry-Perot cavity.

It should be understood that the Fabry-Perot surface of the sapphire body need only be partially reflective.

The hollow may take the form of a recess. The sensor is then preferably configured to receive an optical waveguide so as to cover the recess. The end of the optical waveguide and the surface of the sapphire body directly opposite the waveguide serve to define the surfaces of the Fabry-Perot cavity. Alternatively, the recess may form a refractive gap between the optical waveguide and the sapphire body, and the sapphire body itself forms the Fabry-Perot cavity, i.e. the surfaces of the sapphire body parallel to the end of the waveguide serve to define both surfaces of the Fabry-Perot cavity.

The hollow may alternatively take the form of an enclosed cavity within the sapphire body. In this case, opposing surfaces of the sapphire body that bound the hollow define the surfaces of the Fabry-Perot cavity.

In having a hollow, changes in pressure external to the sensor may be sensed as displacements of the Fabry-Perot surface of the sapphire body. Additionally, the hollow results in improved visibility of the interference fringes and/or improved light budget in comparison to a sapphire sensor having a planar surface affixed to an optical fibre, particularly where the optical fibre is a sapphire fibre.

The dimensions of the sapphire body, along with the shape and dimensions of the hollow, may be configured according to the desired sensitivity of the sensor to changes in pressure and temperature. For a sensor that is responsive to changes in pressure, the thickness of the sapphire body at the Fabry-Perot surface is preferably between 50 and 150 µm.

For a sensor which is responsive to changes in temperature, the depth of the hollow may be between 200 and 500 µm. Alternatively, where the hollow serves only as a refractive gap and the sapphire body serves as the Fabry-Perot cavity, the depth hollow is preferably no greater than 2 µm and the thickness of the sapphire body is preferably between 200 and 500 µm thick. However, such an arrangement will not be effective if a highly multimoded fibre, such as a conventional sapphire fibre is used, in which case the depth of the Fabry-Perot cavity is preferably between 0.1 µm and 10 µm. Instead, a sapphire fibre suitably clad with a lower index material or a thermally compatible metal such as platinum, or a single mode fibre of another material would be required.

For a temperature sensor, a cavity limited to 2~5 µm will give a useful response to temperature such as 12 nm movement over 1000° C., noting that white light interferometry suitable for nanometer resolution gives better than 10% accuracy. However, increasing the cavity length further will not be possible with a highly multimoded sapphire fibre, for which there is a limit of fringe visibility at a cavity depth of about 7 µm. For more accurate temperature measurement using a multimodal fibre a sensor using either a bimorph or a structure similar to the pressure sensor but with a metal layer deposited on the membrane preferably inside the cavity to prevent oxidation can be used. A suitable metal for this layer is molybdenum because it has a coefficient of thermal expansion of about $5.1 \times 10^{-6}/°$ C., compared with that of sapphire which ranges from about $4.5 \times 10^{-6}/°$ C. at 25° C. to about $9 \times 10^{-6}/°$ C. at about 1000° C. This would yield, for example, a displacement of several µm over a temperature range of 1000° C. for 50 µm thick sapphire with a 10 µm thick molybdenum layer.

A reflective coating may be disposed over the Fabry-Perot surface of the sapphire body so as to reduce the amount of light escaping from the sapphire body during operation of the sensor. Under certain conditions, particularly high temperatures, the reflective coating may react with the sapphire body or the reflectivity of the coating may deteriorate, e.g. due to oxidation or reduction. Accordingly, the sensor may additionally include a layer of passivation material between the reflective coating and the sapphire body and/or over the exposed surface of the reflective coating. Preferably, the passivation material is thermally matched with the sapphire body so as to minimise any deformation or separation of the passivation layer during subsequent operation of the sensor over a wide temperature range.

The sensor, when configured to respond to changes in temperature, may include an outer coating of a thermoresponsive material, such as a thermoelectric, thermomagnetic, thermoacoustic and/or photothermal material. Consequently, the sensor is able to respond respectively to changes in electric field, magnetic field, acoustics and luminance. For example, the sensor may serve as a current probe by coating the outer surface of the sensor with graphite, which is heated through induced eddy currents.

The Fabry-Perot surface of the sapphire body may be etched with a grating to preferentially reflect only a fundamental mode of the incident light, thereby allowing longer cavities to be used.

The sensor may include an optical waveguide, preferably a sapphire fibre, permanently attached to the sapphire body and optically coupled to the hollow. The optical waveguide of the sensor is preferably configured for optical coupling (e.g. by joining) to a further optical waveguide. Consequently, a conventional silica fibre may be used to communicate light between the sensor and an interferometer. In order to minimise parasitic reflections which might otherwise occur at the junction of the waveguides, the end of the optical waveguide is preferably cleaved at an acute angle to the axis of waveguide. The sensor and optical waveguide are preferably hermetically sealed in a layer of passivation material, such as boron nitride, silicon nitride, aluminum oxide or silicon carbide. Additionally, the optical waveguide may include a ferrule for receiving the further optical waveguide.

In a second aspect, the present invention provides a method of fabricating an optical sensor comprising the steps of providing a sapphire body, and forming a hollow in the sapphire body such that a surface of the sapphire body that describes at least part of the hollow is reflective to incident light and defines a surface of a Fabry-Perot cavity.

The sapphire body may comprise a sapphire wafer in which the hollow is formed by etching a recess in the sapphire wafer. Alternatively, the sapphire body may comprise a first sapphire wafer and a second sapphire wafer, and the hollow is formed by etching a hole through the first sapphire wafer and securing the second sapphire wafer to a surface of the first sapphire wafer so as to close an end of the hole. The sapphire body may include a third sapphire wafer which is secured to the other surface of the first sapphire wafer so as to close the other end of the hole and thereby form an enclosed cavity within the sapphire body.

As noted above, the dimensions of the sapphire body (i.e. the thickness of the sapphire wafers) and the hollow will depend upon the operational characteristics of the sensor.

The method may include coating the Fabry-Perot surface of the sapphire body with a reflective material so as to reduce the amount of light escaping from the sensor. Before applying the reflective coating, the Fabry-Perot surface of the sapphire body may first be coated with a passivation material.

The method may further include securing an optical waveguide to the sapphire body such that the optical waveguide is optically coupled to the hollow. Where the sapphire body comprises a sapphire wafer and the hollow is a recess etched in a surface of the sapphire wafer, the optical waveguide is secured to the sapphire wafer so as to close the recess.

Similarly, where the sapphire body comprises a first sapphire wafer having a through-hole and a second sapphire wafer which covers one end of the hole, the optical waveguide is secured to the first sapphire wafer so as to close the other end of the hole.

The optical waveguide is preferably configured for optically coupling to a further optical waveguide, such as a conventional silica fibre.

Accordingly, the method preferably includes cleaving a free end of the optical waveguide at an acute angle so as to inhibit parasitic reflections and attaching a ferrule to the optical waveguide for receiving the further optical waveguide.

Finally, the method may include coating the outer surfaces of the sapphire body and the optical waveguide with a passivation material such as boron nitride, silicon nitride, silicon carbide, or alumina so as to form a hermetic seal.

The optical sensor of the present invention is particularly well suited for use in a wide range of applications where optical sensors capable of operating at elevated temperatures and/or in chemically harsh environments are required. In particular, the sensor may be used in the automotive industry for monitoring and controlling engine performance and emissions; in the aerospace industry for again monitoring and controlling engine performance but also hydraulics; in coal-fired power stations; in the nuclear industry for monitoring the performance of critical equipment; in oil and gas exploration and recovery; and in industrial process control.

As the sensor is fabricated from sapphire wafers, it can be fabricated using conventional micromachining techniques. Accordingly, the sensor is suitable for mass production.

The invention also provides an interferometer comprising the sensor, in which a sensor cavity of the interferometer is the Fabry-Perot cavity of the sensor.

DESCRIPTION OF PREFERRED EMBODIMENTS

Embodiments of the present invention will now be described by way of example with reference to the accompanying drawings, in which.

SENSOR BODY

Figure 1:
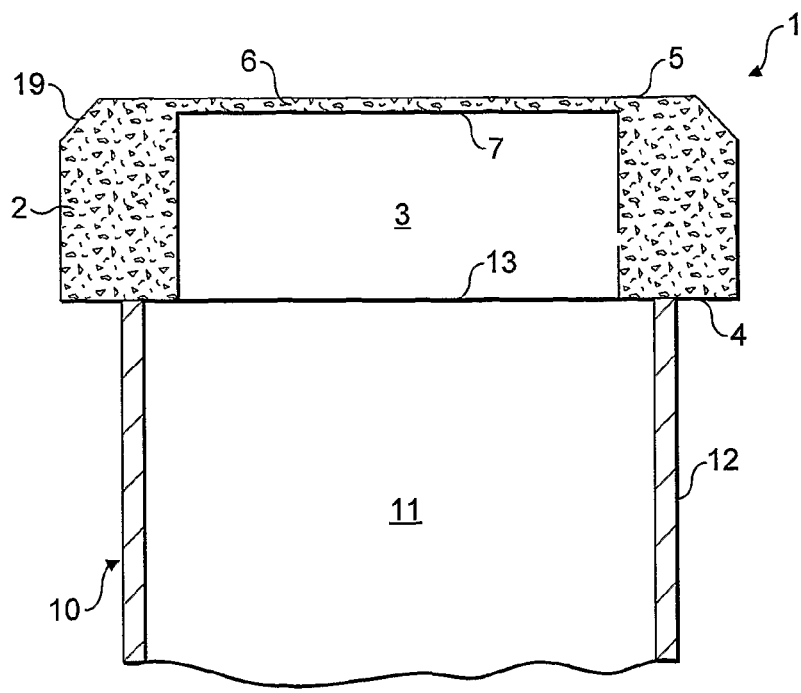
FIG. 1 is a schematic cross sectional view of an optical sensor in accordance with a first embodiment of the present invention.

The optical sensor 1 illustrated in FIG. 1 may be adapted to measure the temperature and/or fluid pressure (gas or liquid, static or flowing) to which the sensor 1 is exposed. The sensor 1 comprises a sapphire body 2 having a recess 3 defined in the bottom surface 4 of the body 2. The portion of the sapphire body 2 disposed at the end of the recess 3 forms a membrane 6. The inner surface 7 of the membrane 6 (i.e. that surface of the membrane 6 immediately adjacent the recess 3) is substantially parallel with the bottom surface 4 of the sapphire body 2 and is preferably planar.

Sapphire is one of the hardest materials known and maintains its structural integrity up to temperatures of around 1600-1700° C. Additionally, sapphire is extremely inert, particularly with regards oxidation, even at elevated temperatures. It is therefore ideally suited as a sensor material for use in high temperature and/or chemically harsh environments. Sapphire is also commercially available as a wafer and thus the sensor 1 may be fabricated using conventional micromachining techniques, as is further described below.

An optical fibre 10 is secured to the bottom surface 4 of the sapphire body 2 so as to close the open end of the recess 3. The central axis of the optical fibre 10 is preferably aligned with respect to the centre of the recess 3 in the sapphire body 2 to achieve good optical coupling between fibre 10 and recess 3. The inner surface 7 of the membrane 6 and the face 13 of the optical fibre 10 serve to form a Fabry-Perot cavity.

Changes in external pressure cause the membrane 6 to deflect resulting in changes in the length of the Fabry-Perot cavity. The shape, size and thickness of the membrane 6 determine the sensitivity of the sensor 1 to pressure variations. In particular, as the diameter of the membrane 6 increases and/or the thickness of the membrane 6 decreases, the sensitivity of the sensor 1 to changes in pressure increases. Additionally, the shape of the membrane 6, which is determined by the profile of the recess 3 and is preferably circular, also influences the pressure sensitivity of the sensor 1. Accordingly, the design of the sensor 1, and in particular the shape, diameter and thickness of the membrane 6, may be tailored according to the desired pressure sensitivity and operational range of the sensor 1. By way of example, a sensor 1 having a circular membrane of around 500 μm in diameter and 200 μm thick will deflect by 1-2 μm when the external pressure is increased from 1 bar to 1000 bars.

The depth of the recess 3 in the sapphire body 2 (i.e. the cavity length) determines the sensitivity of the sensor 1 to temperature variations. Sapphire has a coefficient of thermal expansion of $8.4 \times 10^{-6}$ $K^{-1}$. The Fabry-Perot cavity will therefore expand or contract by around $2.5 \times 10^{-3}$ μm per degree for a sapphire body 2 having a recess depth of 300 μm. This expansion in the Fabry-Perot cavity length corresponds to around $5 \times 10^{-3}$ of an interference fringe which is detectable using conventional white light interferometry, but requires the use of a single molded fibre to carry light to and from the cavity. Using a multimodal fibre may, in practice, limit the length of useful cavity to only a few μm, for example from 0.1 μm to 10 μm.

Sapphire has a relatively high thermal conductivity of around 22 $Wm^{-1}K^{-1}$ and therefore responds relatively quickly to changes in temperature. The temperature coefficient of refractive index of sapphire is around $13 \times 10^{-6}$ $K^{-1}$. Accordingly, temperature-induced changes in the refractive index of the sapphire body 2 will also contribute to changes in the interference fringes, though the contribution is around 100 times smaller than that due to expansion of the sapphire body 2.

The sensitivity of the sensor 1 to changes in temperature may be increased by having a deeper recess 3. However, as the mass of the sapphire body 2 increases the response time of the sensor 20 will decrease. Conversely, the response of the sensor 1 to changes in temperature may be improved by having a thinner sapphire body 2 at the cost of sensitivity.

By modifying the design of the sensor 1, and in particular the thickness of the membrane 6 and the depth of the recess 3, the response of the sensor 1 to changes in temperature and pressure can be varied. For example, in having a membrane 6 less than 50 μm thick and a recess 3 of at least 300 μm in depth, a sensor 1 may be realised that is simultaneously responsive to changes in pressure and temperature. Conversely, by employing a relatively shallow recess 3, temperature-induced changes in the Fabry-Perot cavity length are minimised such that the sensor 1 responds to changes in pressure only. Indeed, where the sensor 1 is intended to measure pressure only, the recess 3 preferably has a depth of no more than 50 μm. Similarly, pressure-induced changes in the Fabry-Perot cavity length can be minimised by employing a suitably thick membrane 6. A membrane 6 of at least 100 μm thick is preferred for a temperature only sensor 1.

In general terms, it will be appreciated that a sensor may be produced which is sensitive to both pressure and temperature, and by scaling the size of the membrane and cavity length that differing sensitivities to each parameter may be achieved.

In the embodiment described above and illustrated in FIG. 1, the Fabry-Perot cavity is defined by the inner surface 7 of the membrane 6 and the face 13 of the optical fibre 10. However, the reflectivity of the sapphire:air interface at visible wavelengths is around 7%. Accordingly, a large fraction of light will pass through the membrane 6 and escape from the sensor 1 resulting in poor fringe visibility.

Figure 2:
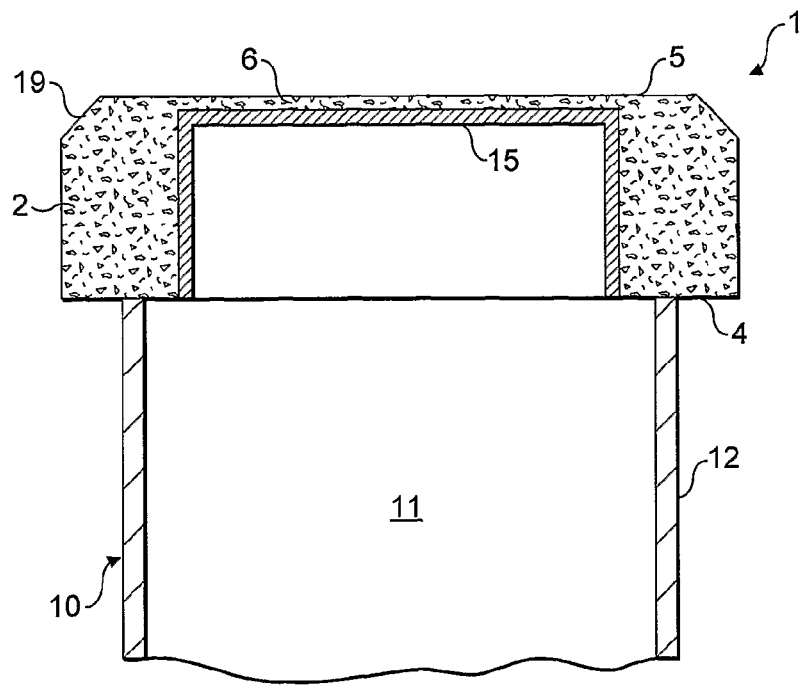
FIG. 2 is a schematic cross sectional view of an optical sensor in accordance with a second embodiment of the present invention.

FIG. 2 illustrates a further embodiment of optical sensor 1 in which the recess 3 of the sensor body 2 is lined with a reflective coating 15. The choice of material for the reflective coating 15 will naturally depend upon the conditions under which the sensor 1 is intended to be used. For example, niobium, molybdenum and tungsten all have melting points above 2500° C. and are therefore well-suited for use at elevated temperatures. The reflective coating 15 is preferably kept thin, ideally no greater than 1 μm and more preferably between 20-50 nm, so as not to adversely affect the response of the membrane 6 to changes in pressure.

At elevated temperatures, the reflective coating 15 may react with the sapphire body 2 and/or its reflectivity may deteriorate due to, for example, oxidation. In the embodiment illustrated in FIG. 3, the reflective coating 15 is sandwiched between two passivation layers 16,17 to prevent any reaction of the reflective coating 15 occurring at high temperatures. The passivation material preferably has a similar co-efficient of thermal expansion to that of sapphire so as to minimise any deformation or separation of the passivation layers 16,17 during subsequent operation of the sensor 1 over a wide temperature range. Suitable passivation materials include boron nitride, silicon nitride and silicon carbide. The passivation layer 16 adjacent the recess 3 should of course be transparent. However, there is no such requirement for the passivation layer 17 adjacent the sapphire body 2. As with the reflective coating 15, the passivation layers 16,17 are preferably thin, ideally no greater than 1 μm, so as not to adversely affect the response of the membrane 6 to changes in pressure.

Where the sensor 1 is intended to measure changes in temperature only, the thickness of the reflective coating 15 and passivation layers 16,17 (if employed) is not particularly important, so long as the length of the cavity is generally maintained.

Rather than employing a passivation layer 16 to prevent oxidation of the reflective coating 15 at elevated temperatures, the optical fibre 10 may be secured to the sensor 1 under vacuum.

By employing passivation layers 16,17 and/or securing the optical fibre 10 under vacuum, almost any reflective material may be used for the reflective coating 15. In particular, metals which would oxidise at relatively low temperatures, e.g. niobium, may be used as the reflective coating 15.

In an alternative embodiment of optical sensor 1 (not illustrated in the accompanying drawings), the portion of the sapphire body 2 forming the membrane 6 is removed and the reflective coating 15, and passivation layers 16,17 if employed, act as the membrane 6. Accordingly, a sensor 1 is realised that is much more sensitive to changes in pressure.

Figure 3:
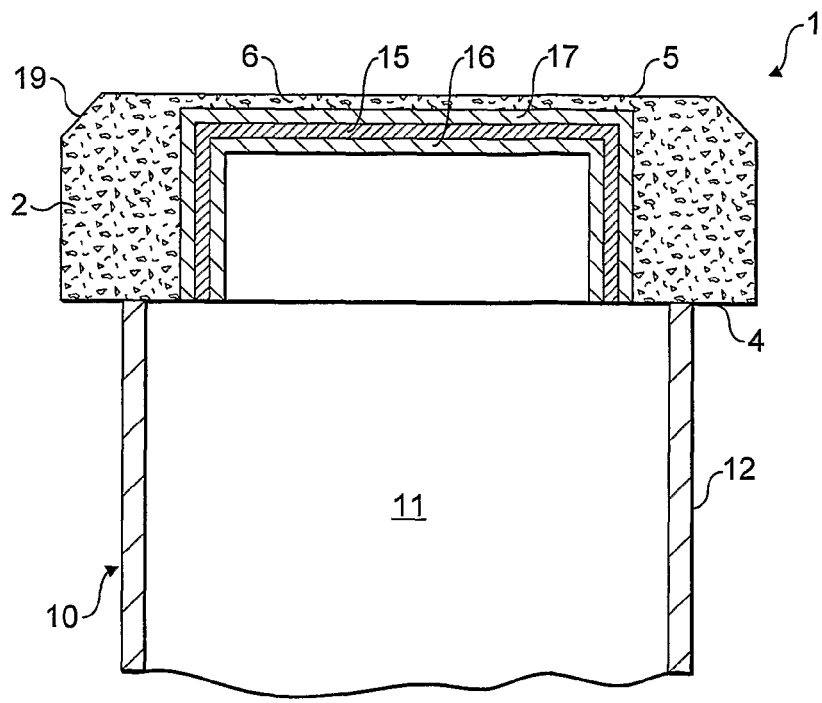
FIG. 3 is a schematic cross sectional view of an optical sensor in accordance with a third embodiment of the present invention.
Figure 4:
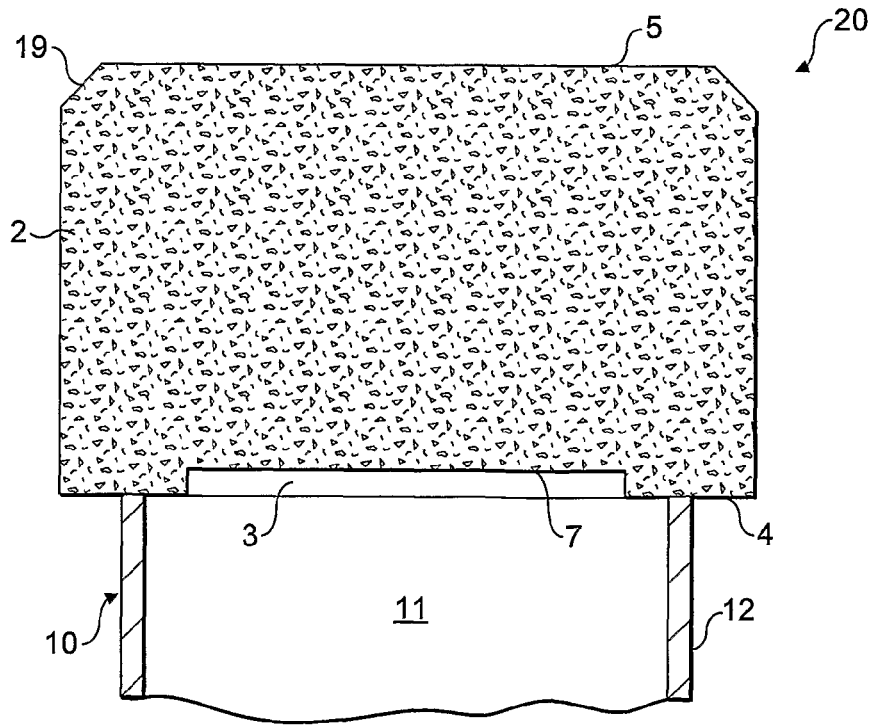
FIG. 4 is a schematic cross sectional view of an optical sensor in accordance with a fourth embodiment of the present invention.

FIG. 4 illustrates an alternative design of optical sensor 20 in accordance with the present invention. Unlike the sensor 1 described above, which may be configured to measure changes in pressure and/or temperature, the sensor 20 of FIG. 4 is intended to measure changes in temperature only. The sensor 20 once again comprises a sapphire body 2 having a recess 3 defined in the bottom surface 4 of the body 2. However, the recess 3 is much shallower than that formed in the sensor 1 illustrated in FIGS. 1-3.

With the optical sensor 1 described above and illustrated in FIG. 1, the recess 3 in the sapphire body 2 serves as the Fabry-Perot cavity, with the inner surface 7 of the membrane 6 and the face 13 of the optical fibre 10 forming the reflective surfaces of the cavity. With the sensor 20 illustrated in FIG. 4, however, the sapphire body 2 itself acts as the Fabry-Perot cavity, with the reflective surfaces defined by the sapphire:air interfaces at the top surface 5 of the sapphire body 2 and the opposing surface 7 defined by the recess 3. The recess 3 therefore serves only to provide a refractive gap between the sapphire body 2 and the optical fibre 10.

The sapphire body 2 is preferably around 300 μm thick and the recess 3 around 0.5 μm deep so as to provide a Fabry-Perot cavity of 299.5 μm in length at room temperature. A change in temperature of 1° C. will therefore result in a detectable change of $2.5 \times 10^{-3}$ μm in the length of the cavity. The thickness of the sapphire body 2 and the depth of the recess 3 may be tailored to suit the sensitivity requirements of the sensor 20, subject, as discussed above, to the modality of the fibre and related constraints.

Again, as with the sensor 1 described above, an optical fibre 10 is secured to the bottom surface 4 of the sapphire body 2 so as to close the open end of the recess 3, with the central axis of the optical fibre 10 preferably aligned with the centre of the recess 3.

The face 13 of the optical fibre 10 is preferably coated with an anti-reflective coating to prevent parasitic reflections occurring at the fibre:air interface. An anti-reflective coating is not, however, essential and it is possible using known interrogation methods to discriminate between cavity and parasitic reflections.

Owing to the relatively poor reflectivity of the sapphire:air interface at the top surface 5 of the sapphire body 2, a large fraction of light may escape from the sensor 20. Accordingly, the top surface 5 of the sapphire body 2 may be covered with a reflective coating 15 (not shown). Layers of passivation material 16,17, as described above, may be disposed over the reflective coating 15 and/or between the reflective coating 15 and the sapphire body 2. Additionally, the surface 7 of the sapphire body 2 immediately adjacent the recess 3 may be coated with a partially-reflective coating, e.g. having a reflectivity of around 50%. For example, the surface 7 may be coated with a thin (~50 nm) metal film to provide a partial mirror.

Figure 5:
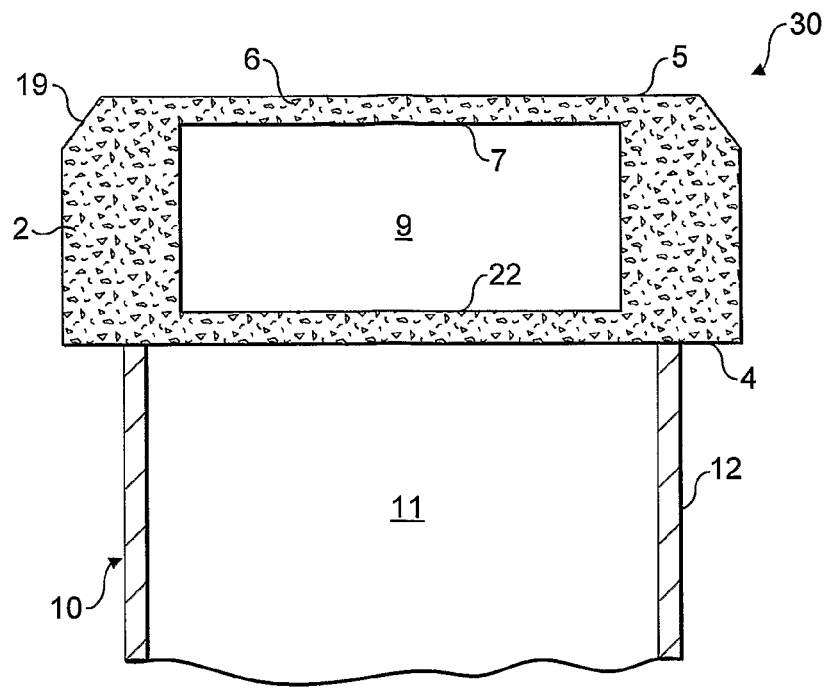
FIG. 5 is a schematic cross sectional view of an optical sensor in accordance with a fifth embodiment of the present invention.

FIG. 5 illustrates a further embodiment of optical sensor 30 in accordance with the present invention. With the sensor 1 of FIG. 1, the recess 3 in the sapphire body 2 is closed by an end 13 of an optical fibre 10 to form a Fabry-Perot cavity. With the sensor 30 of FIG. 5, however, an enclosed cavity 9 exists within the sapphire body 2 which serves as the Fabry-Perot cavity. The cavity 9 is closed at an upper end by the membrane 6 and at a lower end by a basal wall 21. The inner surface 7 of the membrane 6, which serves as one end of the Fabry-Perot cavity, is substantially parallel to the inner surface 22 of the basal wall 21, which serves as the other end of the Fabry-Perot cavity. Moreover, the inner surfaces 7,22 of the membrane 6 and the basal wall 21 are substantially parallel to the bottom surface 4 of the sapphire body 2 and are preferably planar.

The optical fibre 10 is secured to the bottom surface 4 of the sapphire body 2 such that the central axis of the optical fibre 10 is preferably aligned with respect to the centre of the cavity 9 in the sapphire body 2. Owing to the presence of the basal wall 21, the diameter of the optical fibre 10 may be smaller than the diameter of the cavity 9, which preferably has a circular profile. Accordingly, good optical coupling is achievable between the fibre 10 and the Fabry-Perot cavity.

As with the sensor 1 illustrated in FIGS. 2 and 3, the inner surface 7 of the membrane may be lined with a reflective coating 15 and, if required, passivation layers 16,17.

The shape and dimensions of the sensor 30, like the sensor 1 of FIG. 1, may be tailored according to the desired sensitivity of the sensor to changes in pressure and/or temperature. For example, the thickness of the membrane 6 will influence the sensitivity of the sensor 30 to pressure variations, whilst the depth of the cavity 9 will determine the response of the sensor to temperature variations.

Where the sensor 1,20,30 is configured to respond to changes in temperature, the outer surfaces of the sensor 1,20,30 may be coated with a thermoresponsive material (not shown) which changes in temperature in response to changes in an environmental parameter, i.e. the thermoresponsive material converts one form of energy into thermal energy which is then sensed by the sensor 1,20,30. In particular, the thermoresponsive material may be a thermoelectric, thermomagnetic, thermoacoustic and/or photothermal material such that changes in the electric field, magnetic field, acoustics and/or luminance to which the sensor is exposed may be sensed. For example, by coating the outer surface of the sensor 1,20,30 with graphite, which heats-up due to induced eddy currents, the sensor 1,20,30 may serve as a current probe. Where the sensor 1, 30 is intended to additionally measure changes in pressure, the thermoresponsive material preferably does not cover the membrane 6.

Any Fabry-Perot surface of the sapphire body may be etched with a grating to preferentially reflect only a fundamental mode of the incident light, thereby allowing a longer cavity to be used.

Optical Fibre, Connection and Housing

The choice of optical fibre 10 to be secured to the optical sensor 1,20,30 will depend upon the environmental conditions to which the sensor 1,20,30 and fibre 10 are exposed. Silica fibres begin to degrade optically at temperatures above 800° C. Additionally, at elevated temperatures below this, dopants in the silica undergo diffusion and thus silica fibres are unsuitable for long-term use at elevated temperatures. Accordingly, for high temperature applications sapphire fibres are preferably employed.

Whilst an unclad sapphire fibre may be used, light is likely to escape from the fibre 10 due to the accumulation of foreign deposits on the surface. Accordingly, the optical fibre 10 preferably comprises a sapphire core 11 surrounded by cladding 12. The cladding 12 must encourage waveguiding of light along the sapphire core 11 at the operational temperatures to which the sensor 1,20,30 and fibre 10 are exposed.

Ideally, the cladding 12 is also chemically inert (particularly with regards oxidation) at the operational temperatures. Waveguiding of light along the sapphire core 11 can be achieved in one of two ways. In the first, the cladding 12 comprises a material having a lower refractive index than that of the sapphire core 11 such that waveguiding is achieved by total internal reflection. Alumina, yttria, boron nitride and silicon carbide are all suitable examples of an inert cladding material having a lower refractive index than that of sapphire and a melting point greater than 2000° C. In the second, the cladding 12 comprises a reflective metal coating and waveguiding is achieved by mirror reflection. Platinum is a suitable example of a reflective metal coating having a melting point of around 1780° C. Oxidation of platinum initially occurs at the exposed outer surface of the cladding 12 which then acts to prevent any significant oxidation of the remaining platinum below temperatures of around 1400° C. The platinum may alternatively be used to protect a cladding material of lower refractive index. Whilst reflective coatings have the disadvantage of absorption loss, this may not present a problem for a short fibre sensor. Indeed, as is discussed below, the sapphire fibre 10 and sensor 1,20,30 are preferably formed as a single element for attachment to a conventional silica fibre by means of a ferrule. Where a cladding material of lower refractive index is used, the thickness of the cladding 12 is preferably such that total internal reflection is achieved at visible or infrared wavelengths.

Where the cladding 12 is transparent or translucent, light external to the fibre 10 and sensor 1,20,30 may enter the fibre core 11. Accordingly, the cladding 12 may comprise an additional outer layer of opaque material. The choice of opaque material will depend upon the operation characteristics of the sensor 1,20,30. For temperatures above 1000° C., suitable candidates include graphite or opaque silicon carbide.

If any layer of the cladding 12 is susceptible to oxidation or is likely to react chemically with the environment to be probed, the cladding 12 may also include an outer passivation coating to inhibit any such reaction. Suitable materials include, but are not limited to, boron nitride, silicon carbide and alumina.

The materials employed for the cladding 12 are preferably thermally matched with that of sapphire such that cracking or separation of the cladding 12 from the fibre 10 during subsequent use of the sensor 1 is minimised.

Under certain environmental conditions the use of even a clad sapphire fibre may be unsuitable. As an alternative to sapphire and silica fibres, a hollow waveguide may be employed to communicate light to and from the sensor 1. Suitable waveguides for high temperature applications include hollow ceramic rods, e.g. made of alumina, or a refractory metal tube. An anti-reflective coating may be provided at the interface of the hollow waveguide and sensor 1.

As the sensor 1,20,30 and fibre 10 are intended to be employed in high temperature and/or chemically harsh environments, the use of adhesives to secure the optical fibre 10 to the sensor 1,20,30 is generally not suitable. Where a sapphire fibre or hollow ceramic rod is employed, the fibre 10 or rod is preferably fused to the sensor 1,20,30 by vacuum hot pressing. A silica fibre, on the other hand, is preferably secured to the sensor 1,20,30 by glass solder, whilst a refractory metal tube is preferably secured by welding. Alternatively, the sapphire fibre 10 and the hollow waveguide (ceramic rod or metal tube) may be secured to the sensor 1,20,30 by laser welding. Sapphire is transparent only to radiation having wavelengths between about 0.3 and 4 μm. Accordingly, laser welding may be performed using deep UV excimer lasers operating at wavelengths below 0.3 μm, e.g. 0.13 or 0.2 μm.

In a preferred embodiment the sapphire fibre is bonded to the sensor using thermocompression bonding at 1200° C. under 1 Mpa pressure. An outer protective alumina tube is similarly bonded to the sensor head. The alumina tube is enclosed in a refractory metal (eg Inconel) tube. There may be some alumina fibre material to act as a support to take up the slack between the alumina and the inconel to allow for thermal expansion and vibration damping. The far end of the inconel tube may be featured to allow screwing on of a conventional fibre connector holding either sapphire, silica or metal coated silica fibre, depending on the temperature at the connector end. The sapphire fibre is held in the alumina sheath either by a ceramic cement or due to the small mismatch in thermal expansivities of alumina and sapphire the alumina may be shrink fitted onto the sapphire. Alternatively it is possible to metallise sapphire and alumina and use a high temperature braze to join the two together.

In another embodiment the sapphire fibre is spaced from the cavity by a distance of typically between 3 and 100 µm to avoid the necessity to have a sapphire to sapphire bond. The minimum distance is dictated by the need not to have a parasitic cavity that may be confused with the measurement cavity.

The bonding temperature for thermocompression bonding may be reduced to as low as 600° C. if the sapphire/alumina is treated with an oxygen plasma immediately before bonding.

Figure 10:
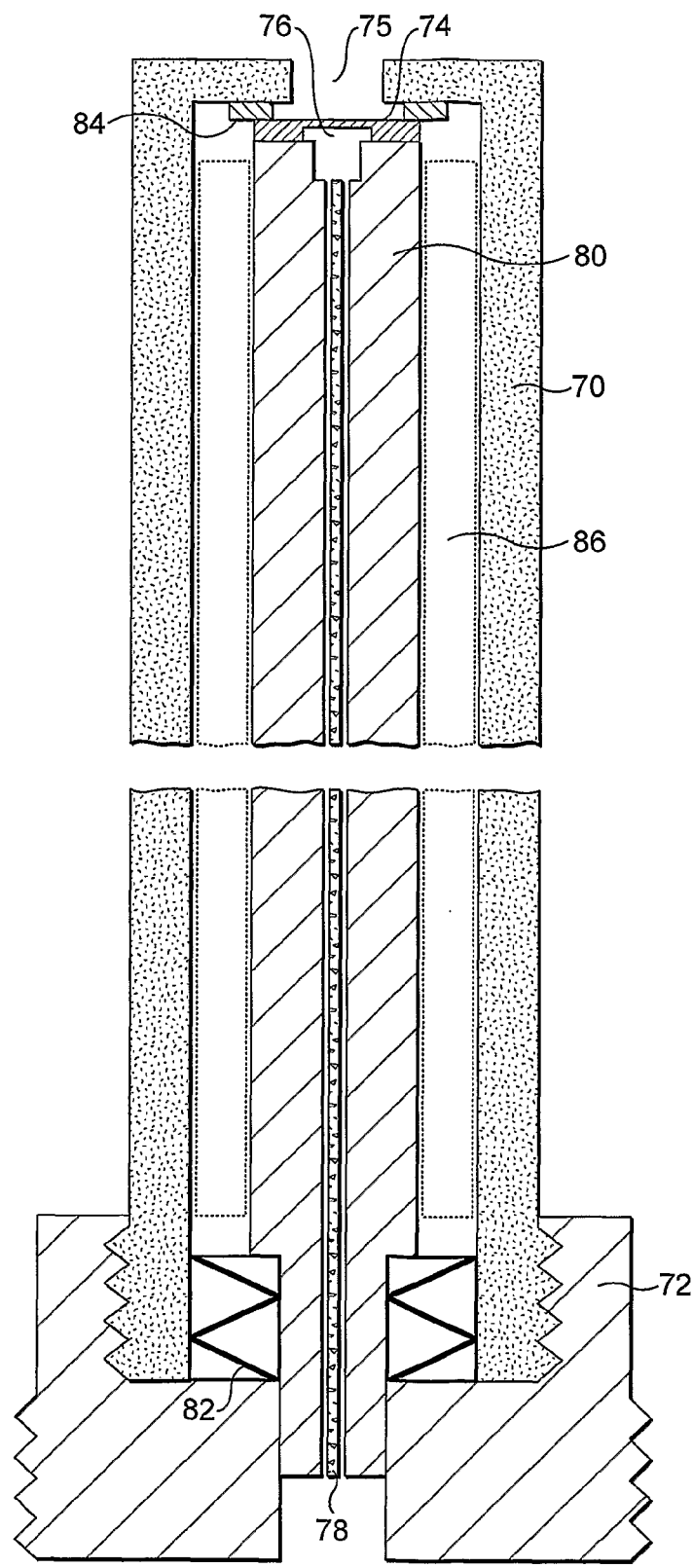
FIG. 10 illustrates a packaged sapphire sensor for use in an adverse environment.

FIG. 10 illustrates an embodiment of the invention for use in an adverse, and especially a high temperature environment such as a gas turbine or similar. A protective casing 70 is formed from Inconel as a hollow cylinder with a diameter of about 10 mm and a length of about 75 mm. The base of the Inconel casing is seated within a cylindrical Inconel bush 72.

A sapphire sensor 74 as described above and incorporating a Fabry-Perot cavity 76 is located behind an open window 75 in the end of the casing 70 distant from the bush 72. The sensor 74 is connected to a sapphire optical fibre 78 which runs along the axis of the casing 70 to the bush 72, and which is encased in a cylinder 80 of alumina.

The cylinder 80 is urged towards the window 75 of the casing by a helical metal spring 82 within the bush 72, but the sapphire sensor is separated from the Inconel casing around the window 75 by an alumina paper gasket 84. The space between the alumina cylinder 80 and the casing 70 is occupied by an alumina paper liner 86.

Owing to the difference in the coefficients of thermal expansion for sapphire ($8.4 \times 10^{-6}$ K$^{-1}$) and silica ($0.55 \times 10^{-6}$ K$^{-1}$), a silica fibre may become detached from the sapphire body 2 when the sensor 1,20,30 is used over a wide temperature range. Accordingly, for such applications, a sapphire fibre or hollow waveguide is preferably employed.

Where a sapphire fibre 10 is secured to the sensor 1, the end of the fibre 10 and/or the surface 4 of the sapphire body 2 to which the fibre 10 is secured may be doped with a material such that radiation of a particular wavelength is more strongly absorbed by the doped region than by the undoped sapphire. Accordingly, laser light (which is weakly absorbed by sapphire and more strongly absorbed by the doped region) may then be guided along the sapphire fibre to the fibre:sensor interface whereupon the doped region selectively or preferentially absorbs the laser light to create localised welding between the fibre 10 and sensor. By doping the surface 4 of the sapphire body 2, the same process of localised welding may also be achieved using a ceramic rod.

Where the sensor 1 includes a bonding layer 8, as is described below, the material of the bonding layer 8 may be chosen or include a dopant (e.g. silicon) such that radiation of a particular wavelength is selectively or preferentially absorbed by the bonding layer 8. Accordingly, localised welding may again be achieved between the sensor 1 and the fibre/waveguide.

Figure 6:
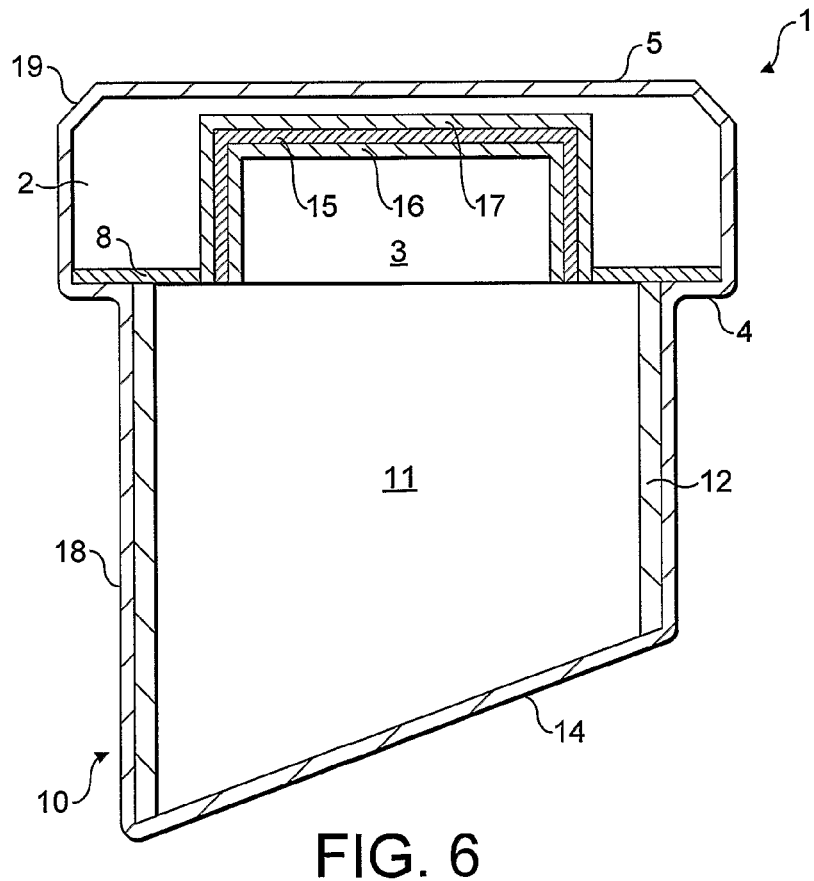
FIG. 6 is a schematic cross sectional view of an optical sensor in accordance with a sixth the present invention.

As is shown in FIG. 6, where the optical fibre 10 is a sapphire fibre, the optical sensor 1 preferably includes a bonding layer 8 disposed over the bottom surface 4 of the sapphire body 2 surrounding the recess 3. Where the sensor 30 is of the type illustrated in FIG. 5, the bonding layer 8 may be disposed over the entire bottom surface 4 of the sapphire body 2. The bonding layer 8 acts as a eutectic binder or flux for the sapphire fibre 10 and sapphire body 2 during the step of vacuum hot pressing. As a result, the sapphire fibre 10 and sapphire body 2 may be fused together at temperatures of around 1000° C. rather than the normal 1500° C. Suitable materials for the bonding layer 8 include yttrium aluminum garnet (YAG) and yttrium oxide (yttria). The bonding layer 8 is preferably no thicker than about 0.5 µm. This then ensures that all of the material of the bonding layer 8 diffuses into the sapphire body 2 and fibre 10 upon fusing so as to create a sapphire:sapphire interface. Additionally, the bonding layer 8 is preferably discontinuous over the disposed surface 4 of the sapphire body 2. For example, the bonding layer 4 may be formed as a series of parallel lines, concentric rings or spiral. In having a discontinuous bonding layer 8, the likelihood of any material of the bonding layer 8 existing between the sapphire:sapphire interface after fusing is reduced.

With the sensor 30 illustrated in FIG. 5, the diameter of the cavity 9 in the sapphire body 2 may be larger than the diameter of the optical fibre 10 such that all light from the optical fibre 10 is coupled to the Fabry-Perot cavity. With the sensors 1,20 illustrated in FIGS. 1-4, on the other hand, the fibre 10 is secured to the sensor 1, 20 by that part of the fibre 10 that extends beyond the recess 3 in the sapphire body 2. When the optical fibre 10 is a sapphire fibre secured to the sensor body 2 by vacuum hot pressing, the core 11 of the fibre 10 must extend beyond the recess 3. By increasing the diameter of the sapphire core 11, a firmer securement is formed between fibre 10 and sensor 1,20. However, the percentage surface area of the core 11 that is coupled to the recess 3, and therefore to the Fabry-Perot cavity, is decreased. Accordingly, a balance must be struck between securement and efficient optical coupling. Preferably, the ratio of the recess 3 diameter to the sapphire core 11 diameter is no less than 0.8. In any event, the difference between the diameter of the sapphire core 11 and the recess 3 should ideally be no less than 1 µm.

The optical fibre 10 may include a sapphire collar (not shown), which surrounds the end 13 of the fibre 10 to be secured to the sapphire body 2. A yttria paste may be used to secure the collar to the fibre 10. The fibre 10 may then be secured to the sensor 1 by fusing the sapphire collar to the sapphire body 2. Accordingly, the core of the fibre 10 need not extend beyond the recess 3 but may instead be fully coupled with the Fabry-Perot cavity.

As is illustrated in FIG. 6, the sensor 1 and optical fibre 10 may additionally be encased in a hermetic coating 18 such as boron nitride. Ideally, the material used for the hermetic coating 18 is thermally matched with sapphire so as to prevent cracking or separation of the hermetic coating from the sensor during subsequent operation of the sensor 1 over a wide temperature range. If the sensor 1 is intended to measure pressure, the hermetic coating 18 should ideally be thin (e.g. no greater than 1 µm), particular in the region around the membrane 6, so as not to adversely affect the sensitivity of the sensor 1 to changes in pressure.

The sensor 1 and optical fibre 10 may be formed as a single component, or sensor head, for attachment to another fibre, in particular a conventional silica fibre, by means of a ferrule (not shown). Accordingly, a much cheaper silica fibre may be used to communicate light between the sensor head and the interferometer. The length of the sapphire fibre is preferably chosen such that sensor head is the only component exposed to the adverse conditions, the silica fibre being attached to the sensor head at some position outside. As is illustrated in FIG. 6, the free end 14 of the optical fibre 10 is preferably angled so as to prevent parasitic reflections at the fibre junction. The free end of the optical fibre 10 preferably includes a cladding mode stripper (e.g. a coating or jacket disposed over the cladding 12 and having a refractive index greater than that of the cladding 12) so as to remove any modes transmitted to the cladding 12 at the fibre junction.

Although FIG. 6 illustrates a sensor 1 of the type illustrated in FIG. 1, the sensors 20,30 illustrated in FIGS. 4 and 5 may similarly be formed with the optical fibre 10 as a single component and encased in a hermetic coating 18.

Fabrication Methods

A method of fabricating the sensor 1 illustrated in FIG. 6 will now be described. Some of the steps that will be described may be omitted from the fabrication process depending on the design of sensor 1 that is required. For example, the non-essential steps of depositing a bonding layer 8 or lining the recess 3 with a reflective coating 15 and passivation layers 16,17 may be omitted. Moreover, whilst reference is made below to specific dimensions, it will be appreciated that these are provided by way of example only and that alternative dimensions may be used.

Figure 7:
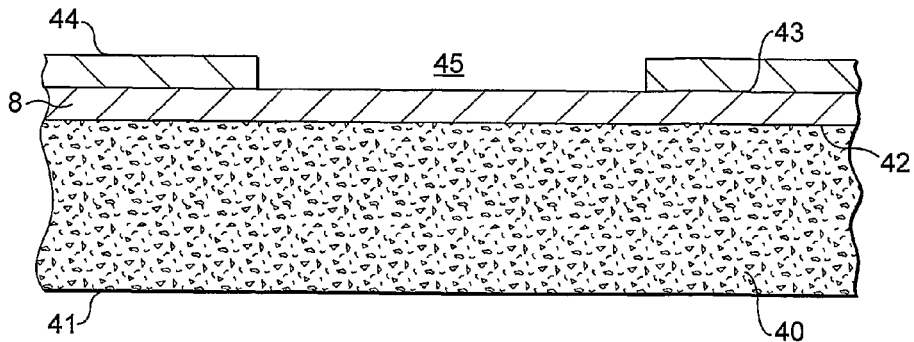
FIG. 7 illustrates a step in the process of manufacturing the sensor of FIG. 6.

As shown in FIG. 7, the first step of fabrication involves providing a sapphire wafer 40, typically 300 μm thick. A bonding layer 8 of yttria, YAG or other group IIIA compound is then deposited over the upper surface 42 of the sapphire wafer 40 by, for example, sputtering, reactive sputtering, reactive evaporation or chemical vapour deposition. The bonding layer 8 is deposited to a thickness of preferably about 0.5 μm.

The exposed upper surface 43 of the bonding layer 8 is covered with a photoresist mask 44 that is lithographically patterned with a circular aperture 45. The aperture 45 formed in the mask 32 may be of an alternative shape but circular is preferred, particularly when the sensor is to be fused to a sapphire fibre. The aperture 45 in the photoresist mask 44 is then transferred to the bonding layer 8 by wet chemical etching using, for example, phosphoric acid, or by ion beam etching, Ar sputtering or dry etching using BCl3+Cl2+Ar. The mask 44 may additionally be patterned with one or more features (not shown) such that the region of the bonding layer 8 surrounding the aperture 45 is discontinuous after etching. For example, the mask 44 may be additionally patterned with a series of parallel grooves, concentric circles or a spiral.

The region of the upper surface 42 of the sapphire wafer 40 exposed by the aperture in the bonding layer 8 is subsequently etched to create a recess 3 in the sapphire wafer 40. Wet or dry etching is employed according to the depth of the recess 3 that is to be etched. For a recess 3 of depth less than about 10 μm, dry etching is preferred. For depths greater than about 10 μm, wet etching is preferred using, for example, hot hydrofluoric acid. After the recess 3 has been etched in the sapphire wafer 40, the photoresist mask 44 is removed from the bonding layer 8.

Figure 8:
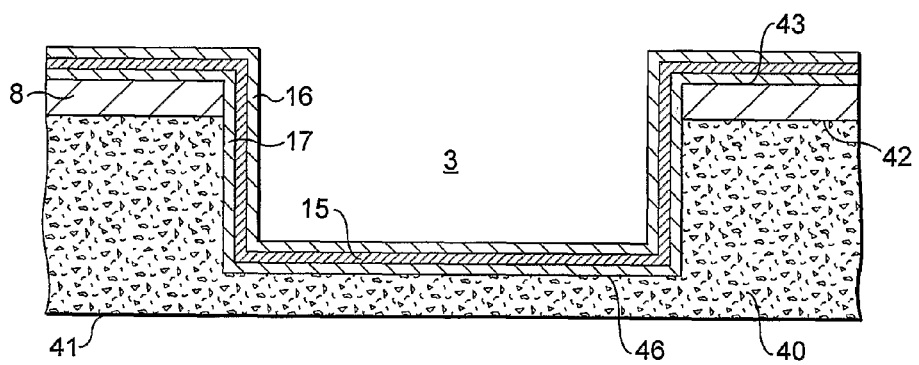
FIG. 8 illustrates a further step in the process of manufacturing the sensor of FIG. 6.

As shown in FIG. 8, a first passiviation layer 17, such as boron nitride, is then deposited over the exposed upper surface 43 of the bonding layer 8 and the exposed surfaces 46 of the sapphire wafer 40 defined by the recess 3. A reflective coating 15, such as niobium, molybdenum or tungsten, is then deposited over the first passivation layer 17, and a second passivation layer 16, such as boron nitride, is deposited over the reflective coating 15. Deposition of all three layers 15,16, 17 is preferably by sputtering.

The recess 3 in the second passivation layer 16 is then filled with resist and the region of the reflective coating 15 and passivation layers 16,17 not covered by the resist are etched using chlorine-based chemistry (e.g. chlorine, silicon tetrachloride) or $CF_4/O_2$ for dry etching metals. The choice of etchant will naturally depend upon the materials used for the reflective coating 15 and passivation layers 16,17. The resist is then removed from the recess 3.

Finally, the lower surface 41 of the sapphire wafer 40 is ground down until the desired thickness of membrane 6 is attained and then chemically polished. Annealing may be used to minimise subsurface damage. It may be advantageous to sculpt the membrane for example to make it thinner at the edges to improve its mechanical response.

Figure 9:
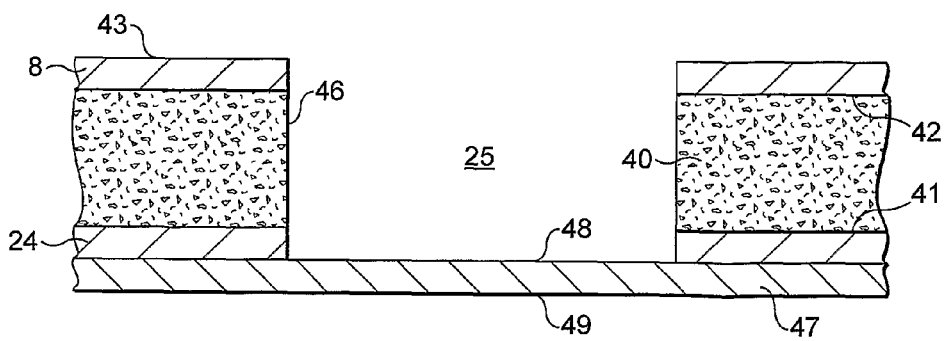
FIG. 9 illustrates a step in an alternative process of manufacturing the sensor of FIG. 6.

An alternative method of fabricating the sensor 1 of FIG. 6 will now be described with reference to FIG. 9. Once again, the fabrication process begins with the provision of a sapphire wafer 40. With this method of fabrication, the thickness of the sapphire wafer 40 determines the eventual length of the Fabry-Perot cavity. Accordingly, if the wafer 40 is not of the required thickness (e.g. 50 μm for a pressure-sensitive sensor), the sapphire wafer 40 is ground down until the required thickness is achieved.

A bonding layer 8 of yttria or YAG is then deposited over the upper surface 42 of the sapphire wafer 40 by sputtering. Optionally, a second bonding layer 24 is deposited over the lower surface 41 of the sapphire wafer 40. Both bonding layers 8,24 are preferably deposited to a thickness of around 0.5 μm.

A through-hole or channel 25 is then formed through the sapphire wafer 40 and the bonding layers 8,24. Various methods commonly used in micromachining fabrication are available for forming the channel 25.

For example, the channel 25 may be formed by first covering the bonding layer 8 with a photoresist mask 44 that is lithographically patterned with a, preferably circular, aperture 45. Wet or dry etching may then be used to etch the sapphire wafer 40 and bonding layers 8,24 exposed by the aperture 45 in the mask 44. Alternatively, the sapphire wafer 40 and bonding layers 8,24 exposed by the aperture 45 in the mask 44 may be etched by powder blasting, i.e. subjecting the exposed sapphire wafer 40 and bonding layers 8,24 to a jet of hard powders, such as silicon carbide or tungsten carbide.

Alternatively, the channel 25 may be formed in the sapphire wafer 40 and bonding layers 8,24 by mechanical drilling, laser drilling, ultrasonic drilling or by electro-discharge machining.

Once the channel 25 has been formed in the sapphire wafer 40 and bonding layers 8,24, a second sapphire wafer 47 is bonded to the lower surface 41 of the first sapphire wafer 40. Bonding of the wafers 40,47 is preferably by vacuum hot pressing with the second bonding layer 24 disposed over the lower surface 41 of the wafer 40 acting as a eutectic binder or flux.

The reflective coating 15 and passivation layers 16,17 are deposited over the surface 48 of the second sapphire wafer 47 exposed by the channel 25. There are two methods of achieving this. In the first, the reflective coating 15 and passivation layers 16,17 are deposited in an manner identical to that described above and illustrated in FIG. 8, i.e. the layers 15,16, 17 are deposited over the exposed upper surface 43 of the bonding layer 8 and the surfaces 46,48 of the first 40 and second 47 sapphire wafers exposed by the channel 25, the channel 25 is then filled with resist and the region of the layers 15,16,17 not covered by the resist is etched. In the second, the reflective coating 15 and passivation layers 16,17 are deposited onto the surface 48 of the second sapphire wafer 47 before bonding to the first sapphire wafer 40. A mask is employed to ensure that no deposition occurs over the surface of the second wafer 47 which bonds with the first sapphire wafer 40, i.e. deposition occurs only over that region of the second wafer 47 which remains exposed by the channel 25 after bonding.

Whilst reference has been made to depositing the second bonding layer 24 over the lower surface 41 of the first sapphire wafer 40, it will of course be appreciated that the second bonding layer 24 may alternatively be deposited over the bonding surface 48 of the second sapphire wafer 47.

Finally, if necessary, the lower surface 49 of second sapphire wafer 47 which serves as the membrane 6 is ground to the appropriate thickness.

With the first method of fabrication described above, the recess 3 in the sapphire body 2 is formed by wet or dry etching a sapphire wafer 40. Accordingly, the method is not well-suited for fabricating sensors 1 having a recess 3 greater than about 50 μm in depth. However, by forming an initial through-hole or channel 25 in the sapphire wafer 40, which is then capped by a second sapphire wafer 47, the manufacture of sensors 1 having Fabry-Perot cavities greater than 50 μm is made possible within commercially realistic timescales. In particular, powder blasting, mechanical drilling and laser drilling are all capable of quickly forming a channel through a relatively thick (e.g. 300 μm thick) wafer. Additionally, wet or dry etching may be used to etch a channel 25 in a relatively thin wafer (e.g. less than 50 μm). A series of wafers etched in this manner may then be stacked with their channels aligned to create a wafer of the required thickness, i.e. the required Fabry-Perot cavity length. The sensor 1 is then finished by bonding the second sapphire wafer 47 to the stack.

Fabrication of the optical sensor 20 illustrated in FIG. 4 is relatively straightforward. As before, a sapphire wafer 40, typically 300 μm thick, is provided and a recess 3, of say 0.5 μm in depth, is etched into the upper surface 42 of the wafer 40 by the first method of fabrication described above. If required, a reflective coating 15 and passivation layers 16,17 are deposited over the lower surface 41 of the sapphire wafer 40.

The sensor 30 illustrated in FIG. 5 is fabricated by first manufacturing an intermediary sensor 1 of the type illustrated in FIG. 6. The intermediary sensor 1 may be fabricated by either the first (recess) method or the second (channel) method described above. A third sapphire wafer is then bonded to the upper surface 42 of the first sapphire wafer 40, preferably by hot vacuum pressing. The bonding layer 8 (if employed) acts as a eutectic binder or flux for the binding wafers. A bonding layer of yttria or YAG may then be deposited on the exposed surface of the third sapphire wafer.

The third sapphire wafer, or indeed of the fibre 10, is preferably secured to the upper surface 42 of the first sapphire wafer 40 under vacuum. Consequently, any potential deterioration of the reflective coating, during the subsequent use of the sensor 1,20,30 at elevated temperatures, is minimised without requiring the provision of the second passivation layer 16.

In a final processing step, the wafer structure of each sensor 1,20,30 is scribed using a laser or by powder blasting and the wafer structure is broken along the scribed lines to define the sensor 1,20,30. The sheared corners 19 of the sensors 1,20,30 illustrated in FIGS. 1 to 6 are artifacts of the scribing process.

The chips may be singulated by laser or diced out, stacked into piles (with a suitable binder/adhesive), to produce a 'rod' which is then diamond turned into a cylinder. The chips are then demounted and the resulting circular die are ready.

The clad sapphire fibre is fabricated by first cleaving the ends of the sapphire fibre to define the facets 13,14. As is illustrated in FIG. 6, one end of the fibre 14 is preferably cleaved at an angle to prevent parasitic reflections. A layer of waveguiding material is then deposited, preferably by sputtering, over the length of the fibre. As described above, the waveguiding material may be a material having a lower refractive index than sapphire (e.g. alumina, yttria, boron nitride, silicon carbide) or it may be a material having a high reflectivity (e.g. platinum). If required, a layer of opaque material, such as graphite, is deposited, again by sputtering, over the waveguiding material to prevent external light creeping into the fibre. If this cladding has a suitable index or is a metal it may allow single mode operation of the fibre. Finally, a passivation layer of, for example, boron nitride is deposited over the opaque and/or waveguiding material.

After the sapphire fibre 10 has been secured to the sensor 1,20,30, e.g. by vacuum hot press, the sensor 1,20,30 and fibre 10 are hermetically sealed by depositing a thin layer (e.g. <1 μm) of passivation material 18, such as boron nitride, over the exposed surfaces of the sensor 35 and fibre 10, including the free end 14 of the fibre 10. The passivation material 18 is preferably deposited by sputtering. Finally, a ferrule (not shown) is attached to the free end 14 of the fibre 10, for example, by shrink fitting.

Whilst reference has been made above to specific micromachining processes, it will be appreciated that other known suitable forms of etching, deposition and bonding may be employed in the fabrication of the sensor 1,20,30. For example, the recess 3 in the sapphire wafer 40 may be formed by laser ablation rather than wet or dry etching, whilst evaporation or CVD may be used as an alternative to sputtering.

With the optical sensors of the present invention, the pressure and/or temperature may be measured within chemically harsh and/or high temperature environments not possible with silicon-based sensors. It is anticipated that practical applications for the sensors will include, among other things, the automotive and aerospace industries for monitoring and controlling engine performance and emissions; the nuclear industry for monitoring the performance of critical equipment; in the monitoring of coal-fired power stations; in gas and oil exploration; and in industrial process control.

By employing the methods described above, several sensors may be fabricated from a single sapphire wafer in a particularly cost-effective manner. Moreover, a sensor may be fabricated for quick and easy attachment to a conventional optical fibre.

Interferometry Techniques

The various sensor embodiments described above may be interrogated using any generally accepted method of interfacing with a Fabry-Perot cavity. A preferred embodiment is to use white light interferometry which is a well known technique. At its simplest level this involves using a spectrometer and suitable software to calculate the cavity length from the spectral data. Either a mechanical or optoelectronic (ie scanning Fabry-Perot interferometer or integrated optic waveguide cavity with phase modulator) matched cavity may be used to track the measurement cavity.

The invention claimed is:

1. A method of fabricating an optical sensor comprising the steps of:
   providing a body;
   forming an enclosed cavity in the body such that the cavity is closed at a first end by a membrane and at a second end by a wall, wherein said wall and said membrane are included in said body, the cavity being defined by an inner surface of the membrane forming a first surface reflective to incident light and an inner surface of the wall forming a second surface reflective to incident light, the first and second surfaces defining a Fabry-Perot cavity; and securing an optical fibre to the body at an outer surface of the wall, said optical fibre being spaced from said enclosed cavity, and arranging said optical fibre to optically couple incident light output from the optical fibre, through the wall, to the Fabry-Perot cavity and to receive reflections from the first and second surfaces of the cavity, wherein said optical fibre does not contact the inner surface of the wall, and wherein the core of the optical fibre is formed of sapphire, and wherein the body is made entirely of sapphire.

2. The method as claimed in claim 1, wherein the sapphire body comprises a first sapphire wafer and a second sapphire wafer, and the body is formed by etching a recess in a surface of the first sapphire wafer and securing the second sapphire wafer to said surface of the first sapphire wafer so as to close the recess and form the enclosed cavity.

3. The method as claimed in claim 1, further comprising the step of coating the first surface of the sapphire body that defines a surface of the Fabry-Perot cavity with a reflective material.

4. The method as claimed in claim 1, further comprising the step of coating the first surface of the sapphire body that defines a surface of the Fabry-Perot cavity with a passivation material and coating the passivation material with a reflective material.

5. The method as claimed in claim 1, further comprising the step of coating a surface of the sapphire body with a bonding layer of yttria or YAG.

6. The method as claimed in claim 1, wherein the enclosed cavity has a depth of between 0.1 and 500 µm.

7. The method as claimed in claim 1, wherein the enclosed cavity has a maximum diameter of between 10 and 2000 µm.

8. The method as claimed in claim 1, wherein the sapphire body at the first surface that defines a surface of the Fabry-Perot cavity is between 0.1 and 500 µm thick.

9. The method as claimed in claim 1, wherein the Fabry-Perot cavity has a depth of between 0.1 and 10 µm.

10. The method as claimed in claim 1, wherein the optical fibre is secured to the sapphire body by vacuum hot press.

11. The method as claimed in claim 1, wherein the optical fibre is secured to the sapphire body by laser welding.

12. The method as claimed in claim 1, further comprising the step of cleaving a free end of the optical fibre at an acute or obtuse angle.

13. The method as claimed in claim 1, further comprising the step of sealing the sapphire body and the optical fibre in a hermetic coating.

14. The method as claimed in claim 1, further comprising the step of attaching to a free end of the optical fibre a ferrule for receiving a further optical fibre.

15. The method as claimed in claim 1, wherein said sensor is adapted for use at temperatures above 450° C. by making the core of the optical fibre and the body of sapphire.

16. The method as claimed in claim 15, wherein said sensor is adapted for use at temperatures above 800° C. by making the core of the optical fibre and the body of sapphire.

17. The method as claimed in claim 1, wherein said body is formed from a plurality of sapphire wafers which are bonded using a bonding layer between said sapphire wafers.

18. A method of fabricating an optical sensor comprising the steps of:

providing a body;

forming a enclosed cavity in the body such that the cavity is closed at a first end by a membrane and at a second end by a wall, wherein said wall and said membrane are included in said body, the cavity being defined by an inner surface of the membrane forming a first surface reflective to incident light and an inner surface of the wall forming a second surface reflective to incident light, the first and second surfaces defining a Fabry-Perot cavity; and securing an optical fibre to the body at an outer surface of the wall, said optical fibre being spaced from said enclosed cavity, and wherein said optical fibre does not contact the inner surface of the wall, and arranging said optical fibre to optically couple incident light output from the optical fibre, through the wall, to the Fabry-Perot cavity and to receive reflections from the first and second surfaces of the cavity, wherein the core of the optical fibre is formed of sapphire, and the body is made entirely of sapphire, wherein the sapphire body comprises three sapphire wafers, and the step of forming the enclosed cavity comprises forming a hole in the first sapphire wafer, the hole extending from a surface through to an opposing surface of the first sapphire wafer, and securing the second and third sapphire wafers to said surface and opposing surface respectively to close the hole to form the enclosed cavity.

19. The method as claimed in claim 18, wherein said body is formed by bonding said sapphire wafers using a bonding layer between said sapphire wafers.

20. An optical sensor comprising a body having an enclosed cavity within the body, the cavity being closed at a first end by a membrane and at a second end by a wall, wherein said wall and said membrane are included in said body, the cavity being defined by an inner surface of the membrane forming a first surface reflective to incident light and an inner surface of the wall forming a second surface reflective to incident light, the first and second surfaces defining a Fabry-Perot cavity, wherein the sensor further comprises an optical fibre secured to the body at an outer surface of the wall, said optical fibre being spaced from said enclosed cavity, the optical fibre being arranged to optically couple incident light output from the optical fibre, through the wall, to the Fabry-Perot cavity and to receive reflections from the first and second surfaces of the cavity, wherein said optical fibre does not contact the inner surface of the wall, and wherein the core of the optical fibre is formed of sapphire, and wherein the body is made entirely of sapphire.

21. A method of sensing temperature and/or pressure in an environment comprising: locating the sensor of claim 20 in the environment; and measuring the Fabry-Perot cavity using interferometry.

22. The optical sensor as claimed in claim 20, wherein the sapphire body having an enclosed cavity is formed of first and second sapphire wafers, the first sapphire wafer having a recess in a surface, and the second sapphire wafer being secured to said surface to close the recess to form the cavity.

23. A packaged optical sensor comprising the optical sensor of claim 20, and further comprising:

a casing having an open window in an end thereof for directly exposing, the sensor body to the environment surrounding the packaged optical sensor;
a bush in which the casing is seated,
wherein the optical sensor is located behind the window and distant from the bush, and the optical fibre extends along the axis of the casing to the bush, the optical fibre being encased in a cylinder;
a spring within the bush arranged to urge the cylinder towards the window;
a gasket arranged to separate the optical sensor and casing around the window; and
a liner arranged between the cylinder and the casing.

24. The optical sensor as claimed in claim 20, wherein a diameter of said optical fibre is smaller than a diameter of said enclosed cavity.

25. The optical sensor as claimed in claim 20, wherein a diameter of said optical fibre is larger than a diameter of said enclosed cavity.

26. The optical sensor as claimed in claim 20, wherein said sensor is adapted for use at temperatures above 450° C. by having the core of the optical fibre and the body of sapphire.

27. The optical sensor as claimed in claim 20, wherein said sensor is adapted for use at temperatures above 800° C. by having the core of the optical fibre and the body of sapphire.

28. The optical sensor as claimed in claim 20, wherein said body is formed by bonding a plurality of sapphire wafers using a bonding layer between said sapphire wafers.

29. The optical sensor as claimed in claim 20, further comprising a reflective coating disposed over one of said first and second surfaces of the sapphire body.

30. The optical sensor as claimed in claim 29, further comprising a passivation material disposed between one of said first and second surfaces of the sapphire body and the reflective coating.

31. The optical sensor as claimed in claim 20, wherein the cavity has a depth of between 0.1 and 500 μm.

32. The optical sensor as claimed in claim 20, wherein the cavity has a maximum diameter of between 10 and 2000 μm.

33. The optical sensor as claimed in claim 20, wherein the sapphire body at one of said first and second surfaces is between 0.1 and 500 μm thick.

34. The optical sensor of claim 20, wherein the Fabry-Perot cavity has a depth of between 0.1 and 10 μm.

35. The optical sensor as claimed in claim 20, further comprising a coating of a thermoresponsive material disposed over a surface of the sapphire body.

36. The optical sensor as claimed in claim 35, wherein the thermoresponsive material comprises graphite.

37. The sensor as claimed in claim 20, wherein a free end of the optical fibre is cleaved at an acute or obtuse angle.

38. The sensor as claimed in claim 20, wherein the sapphire body and optical fibre are hermetically sealed.

39. The sensor as claimed in claim 20, further comprising a ferrule attached to a free end of the optical fibre for receiving and securing a further optical waveguide.

40. An interferometer comprising the optical sensor of claim 20, wherein the Fabry-Perot cavity is a sensor cavity of the interferometer.

41. The interferometer of claim 40 wherein the interferometer is a white light interferometer.

42. The interferometer of claim 41 further comprising either a reference cavity adjustable to match the sensor cavity, or a spectrometer and associated data processing system, in place of such a reference cavity.

43. A temperature sensor comprising the interferometer of claim 40.

44. A pressure sensor comprising the interferometer of claim 40.

45. An optical sensor comprising a body having an enclosed cavity within the body, the cavity being closed at a first end by a membrane and at a second end by a wall, wherein said wall and said membrane are included in said body, the cavity being defined by
an inner surface of the membrane forming a first surface reflective to incident light and
an inner surface of the wall forming a second surface reflective to incident light, the first and second surfaces defining a Fabry-Perot cavity,
wherein the sensor further comprises an optical fibre secured to the body at an outer surface of the wall, wherein said optical fibre does not contact the inner surface of the wall, said optical fibre being spaced from said enclosed cavity, and the optical fibre being arranged to optically couple incident light output from the optical fibre, through the wall, to the Fabry-Perot cavity and to receive reflections from the first and second surfaces of the cavity,
wherein the core of the optical fibre is formed of sapphire, and the body is made entirely of sapphire, and
wherein the sapphire body having an enclosed cavity is formed of three sapphire wafers, the first sapphire wafer comprises a through hole from a surface to an opposing surface, and the second and third sapphire wafers are secured to the surface and opposing surface respectively, thereby closing the hole to form the enclosed cavity.

46. The optical sensor as claimed in claim 45, wherein said body is formed by bonding said sapphire wafers using a bonding layer between said sapphire wafers.

* * * * *